June 9, 1936.  C. W. CRUMRINE  2,043,968
CAMERA CONSTRUCTION
Filed Oct. 31, 1935   2 Sheets-Sheet 1

INVENTOR:
Chester W. Crumrine,
BY
ATTORNEYS.

June 9, 1936.  C. W. CRUMRINE  2,043,968
CAMERA CONSTRUCTION
Filed Oct. 31, 1935  2 Sheets-Sheet 2

INVENTOR:
Chester W. Crumrine,
BY
ATTORNEYS.

Patented June 9, 1936

2,043,968

UNITED STATES PATENT OFFICE 2,043,968

CAMERA CONSTRUCTION

Chester W. Crumrine, Rochester, N. Y., assignor to Eastman Kodak Company, Rochester, N. Y., a corporation of New York Application October 31, 1935, Serial No. 47,650

7 Claims. (Cl. 95—44)

This invention relates to photographic cameras and particularly to the construction of a camera body and bed adapted to receive roll film. One object of my invention is to provide a camera having a camera body and bed adapted to enclose a camera front of the self-erecting front type in which the camera bed completely covers the erecting mechanism when the camera is in a folded position and in which the camera bed is provided with an extension for covering parts carried by the camera body and by the camera front which are utilized in automatically focusing the camera. Another object of my invention is to provide a novel form of hinge connection between the camera body and camera bed. Still another object of my invention is to provide a range finder camera in which parts of the range finder are carried by a camera front and in which all of the movable parts of the camera and range finder may be enclosed when the camera bed is folded and other objects will appear from the following specification, the novel features being particularly pointed out in the claims at the end thereof.

While I do not contemplate a particular type of front projecting mechanism, I find that the mechanism shown in my copending application, Serial No. 19,012, for Self-erecting front camera, filed April 30, 1935, is entirely suitable and may be used in a preferred embodiment.

Coming now to the drawings wherein like reference characters denote like parts throughout;

Figure 1:
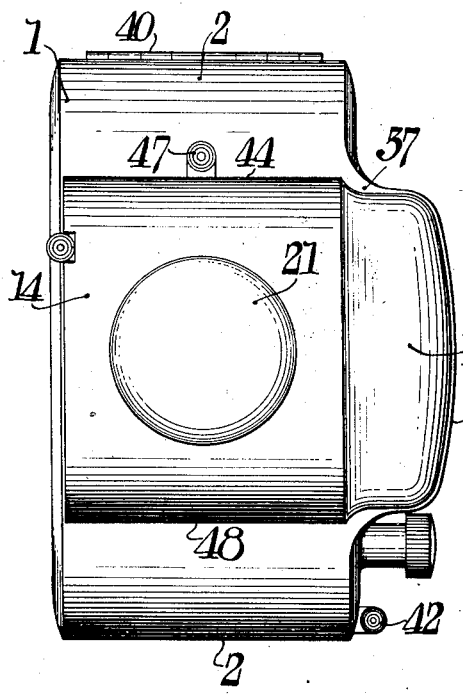
Fig. 1 is a front elevation of a camera constructed in accordance with and embodying a preferred form of my invention, the camera being shown in a closed or folded position.

In accordance with the preferred embodiment of my invention shown in the drawings, the camera may consist of a body portion 1 which may be provided with end portions 2 adapted to form film spool chambers and provided with an opening 3 in the camera body into which the usual camera bellows 4 and the camera front 5 may fold. The camera front or lens board 5 may carry the usual shutter 6 including a cell 7 in which the front lens element 8 may be mounted. The shutter 7 may be provided with the usual setting lever 9 and trigger 10 such as is customary in shutters of a known type. The front board 5 is preferably carried by a series of erecting links or lazy tongs 22 which connect the front board to the camera body in a manner best shown in the copending application above referred to.

Figure 2:
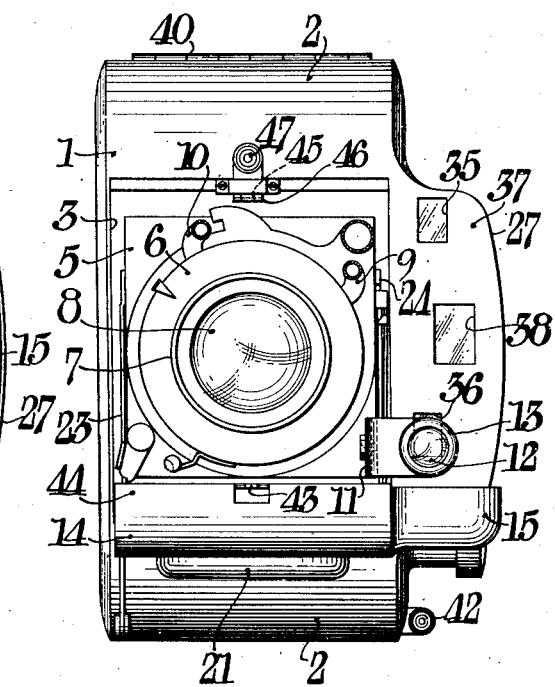
Fig. 2 is a front elevation of the camera shown in Fig. 1 but with the camera in an open or picture-taking position.
Figure 5:
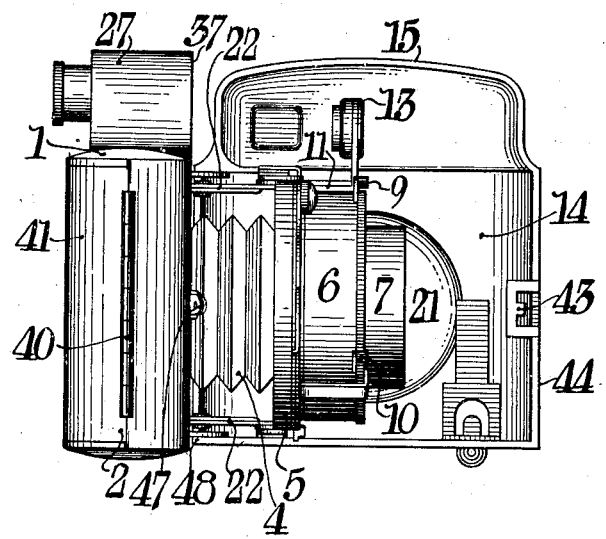
Fig. 5 is an end elevation of the camera with the parts in an open or picture-taking position.

The parts thus described may either fold up into the opening 3 so that the camera bed may be closed as indicated in Fig. 1 or they may be projected from the opening 3 into the picture-taking position shown in Figs. 2 and 5.

Figure 3:
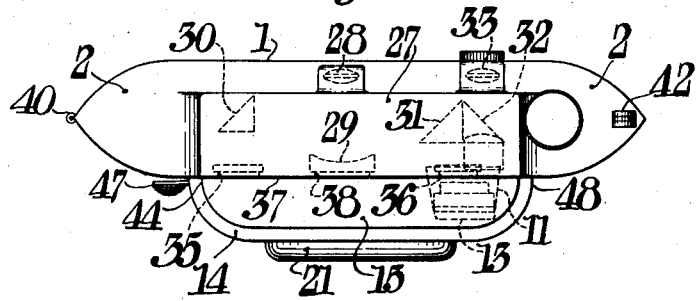
Fig. 3 is a top plan view of the camera shown in Fig. 1.

However, it should be noted that the lens board 5 carries on an outwardly projecting bracket 11, a range finder element 12 mounted in a suitable cell or ring 13. This range finder element moves with the lens board 5 and because of its location extending beyond an edge of the opening 3 in the camera body, it cannot pass into this opening when the camera is folded. Consequently, I provide on the camera bed 14 an offset, shallow, box-like, receptacle 15 which is adapted to enclose the range finder element 12 when the camera is folded as best indicated in Fig. 3.

Figure 6:
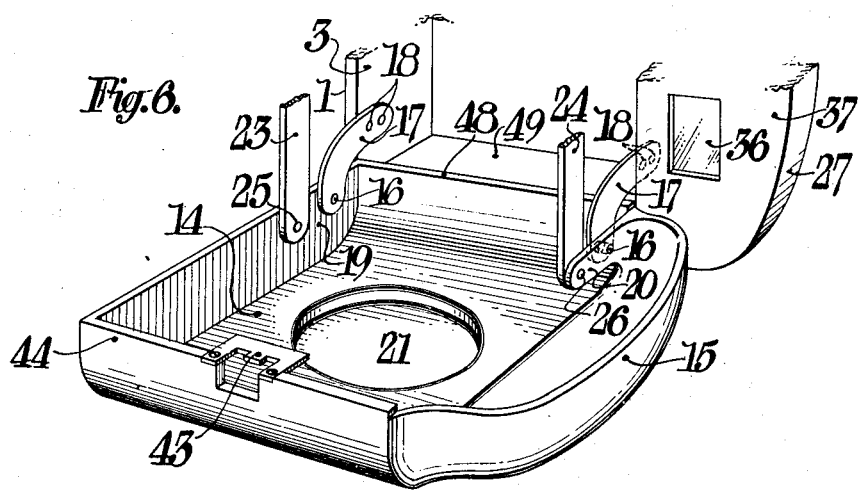
Fig. 6 is a fragmentary perspective view showing the camera bed and a portion of the camera body and the hinged construction for connecting the bed to the camera.

The camera bed proper 14 is a shallow, box-like receptacle which is hinged on the hinge pintles 16 which extend a considerable distance outside of the opening 3 in the camera body 1. As best shown in Fig. 6, the hinged pintles 16 are carried by curved arms 17 which may be affixed at 18 to the walls of the camera body, these brackets being fixedly mounted with respect to the camera walls. One hinged pintle 16 passes into a wide wall 19 of the camera bed and the other hinged pintle 16 passes into a bracket 20 which is formed on the inside of the camera bed 14 projecting between the camera bed proper and the extension 15.

It might be noted here that the camera bed 14 provides a shallow, box-like receptacle covering the main portion of the opening 3 in the camera body and the extension 15 provides a shallow, box-like receptacle of less depth than the depth of the bed 14 and extending to one side thereof. This is illustrated in Fig. 3. It is also desirable, in order to include the modern excessively high speed anastigmat lenses, to have a recess 21 in the center of the bed which is of sufficient size and depth to receive the lens cell 7 of the objective.

The lens board 5 may likewise be attached to the camera bed by means of links 23 and 24, link 23 being pivotally attached to wall 19 of the bed on the stud 25 and link 24 being pivotally attached at 26 to the bracket 20 which also supports one of the hinged pintles 16. The arms 23 and 24 may be attached to the lens board in any desired manner, but preferably as shown in my copending application.

It will be noted that the camera body is provided with an offset housing 27 which extends to one side of the main body portion 1 and which is adapted to enclose parts of the range finder mechanism as indicated in dotted lines in Fig. 3.

The view finder may likewise be carried in the housing 27 and may consist of an eye-piece 28 mounted in alignment with a negative lens 29 which is mounted behind the frame 30 to receive an image of the object being photographed. The range finder may consist of the prisms 30, 31 and 32 and of the lenses 33 and 12, the latter being moved relative to the rest of the optical system as the camera objective is moved in focusing. To permit the light rays to enter in front of the prism 30 is an opening 35 and in front of the prism 32 is an opening 36. It is desirable to close these openings to prevent dust or dirt from entering and to prevent injury to the delicate parts of the range finder mechanism. Consequently, the extension 15 has been provided on one side of the camera bed which will overlie the front wall 37 of the range finder housing 27 and which will effectively enclose not only the windows 35, 38 and 36 in the front wall of the range finder housing but will also enclose the range finder element 12 which is carried by the lens board 5 as above described.

In accordance with a known type of construction the camera body 1 may be provided with a hinge 40 which carries the camera back 41 at one end and the other end of the camera back being adapted to be latched in a closed position by means of a concealed latch, the handle of which 42 projects beyond one wall of the camera body.

The camera bed 14 may be held in a closed position by means of a latch consisting of a relatively fixed lug 43 carried on the front wall 44 of the camera bed, this fixed member being adapted to engage in the notch or opening 45 in the spring member 46 which is provided with an operating handle 47. Thus when member 47 is pressed toward the camera body 1 the notch 45 is removed from the lug 43 and the camera bed is free to fold upon the hinged pintles 16 from the position shown in Fig. 1 to that shown in Fig. 2.

Figure 4:
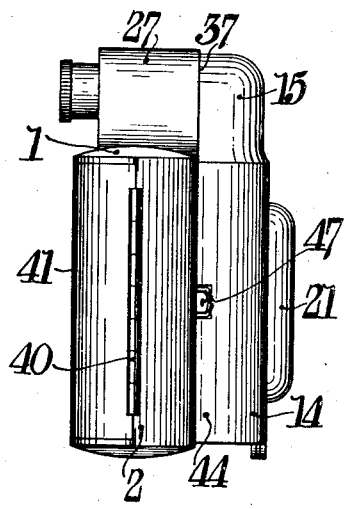
Fig. 4 is an end view of the camera shown in Fig. 1 with the parts in a folded position.

By placing the hinged pintle 16 outside of the camera body 1, the lower end 48 of the camera bed is adapted to lie somewhat above the bottom portion 49 of the opening 3 in the camera body when the parts are in an open position. However, when the bed swings about the hinged pintle 16, the lower edge 48 can readily be brought flush with the camera body 3 as indicated in Figs. 1 and 4. This construction has a number of advantages, among which is that the hinged pintle is entirely concealed when the camera is closed so that the structure presents a neat, smooth appearance.

With the camera construction in accordance with my invention it should be noted from Figs. 1 and 4 that the exterior of the camera, when the parts are in a folded position, presents smooth, graceful lines and the camera bed entirely encloses the delicate parts of the range finder mechanism, obscuring also the apertures leading into the supplementary housing 27.

There is, however, an additional feature accomplished by providing the extension 15 to one side of the camera bed 14 and this extension is useful when the camera is opened as well as when the camera is closed. The range finder element 12, as above explained, is movably mounted on the lens board 5 on the bracket 11.

A high degree of accuracy of movement is required to properly focus the camera objective and since the extension 15 of the camera bed 14 is so positioned that it lies to one side of this bracket when the camera is opened, as indicated in Figs. 2 and 5, the element 12 is adequately protected against injury when the camera is in use and when the camera is open. In other words, it would be difficult for the bracket 11 to be accidentally struck or damaged since it is protected on at least two sides by the extension 15 on the camera bed and by the range finder housing 27 carried by the camera body. Moreover, since the camera bed 14 and the bed extension 15 extend out a material distance beyond the objective 8 and the range finder element 12, the camera can usually be manipulated so that direct sunlight will not fall on either the objective or the range finder element so that there is less liability of having objectionable direct light rays reflecting on these lenses.

While I have shown and described a preferred embodiment of my invention, it is to be understood that I am not to be limited to the specific construction shown but only by the appended claims.

What I claim is:

1. In a camera of the folding type, the combination with a body of substantially rectangular shape having an opening in one side, of a bed hingedly attached to said body along an edge of said opening adapted to close said opening, a supplemental housing carried by the camera body adjacent a side of said opening and adapted to enclose parts of a range finder, and an extension on the bed offset from one side thereof adapted to cover the supplemental housing carried by the camera body.

2. In a camera of the folding type, the combination with a body of substantially rectangular shape having an opening in one side, of a bed hingedly attached to said body along an edge of said opening adapted to close said opening, camera parts mounted on the camera and foldable into the opening, a supplemental housing carried adjacent one side of the opening, a camera part adapted to extend beyond the edges of the opening and opposite to the supplemental housing, and an extension on the bed projecting to one side thereof for covering the second mentioned camera part and the supplemental housing, when said camera bed is moved on its hinge to close said opening.

3. In a camera of the folding type, the combination with a camera body including a generally rectangular housing having an opening therein, of a bed hingedly attached to the housing and adapted to cover and uncover said opening, the bed having walls forming a main portion in the form of a shallow box like structure, a supplementary housing extending from one side of the camera body adjacent its opening, and a supplementary bed portion in the form of a shallow box extension on the camera bed extending from one side thereof and adapted to cover at least a portion of the supplementary housing on the camera body when the bed is moved into engagement with the camera body.

4. In a camera of the folding type, the combination with a camera body including a generally rectangular housing having an opening therein, of a bed hingedly attached to the housing and adapted to cover and uncover said opening, the bed having walls forming a main portion in the form of a shallow box like structure, a supplementary housing extending from one side of the camera body adjacent its opening, and a supplementary bed portion in the form of a shallow box like extension on the camera bed extending from one side thereof and adapted to cover at least a portion of the supplementary housing on the camera body, said extension having a depth less than the depth of the shallow box like main portion of the camera bed and adapted to extend over the supplementary camera housing when the bed is swung upon its hinge toward the camera body to close the opening.

5. In a camera of the folding type, the combination with a camera body, of a range finder housing mounted on one side thereof, a bed hinged to the camera body, a collapsible camera mechanism adapted to move from a collapsed position in the body to an extended position over the bed, and including a lens board, a range finder element carried by the lens board, said camera bed including an offset portion adapted to enclose the range finder element when the camera is in a folded position.

6. In a camera of the folding type, the combination with a camera body, of a range finder housing mounted on one side thereof, a bed hinged to the camera body, a collapsible camera mechanism adapted to move from a collapsed position in the body to an extended position over the bed, and including a lens board, a range finder element carried by the lens board, said camera bed including an offset portion adapted to enclose the range finder elements on the lens board and camera body when the camera is in a folded position.

7. In a camera of the folding type, the combination with a camera body, of a range finder housing mounted on one side thereof, a bed hinged to the camera body, a collapsible camera mechanism adapted to move from a collapsed position in the body to an extended position over the bed, and including a lens board, a range finder element carried by the lens board, said camera bed including an offset portion adapted to enclose the range finder elements on the lens board and camera body when the camera is in a folded position, said lens board having a shallow recess extending over its entire area, said recess also being included in the extension but differing from the shallow recess of the camera bed proper in depth.

CHESTER W. CRUMRINE.